US011928790B2

(12) United States Patent
Watanabe et al.

(10) Patent No.: US 11,928,790 B2
(45) Date of Patent: Mar. 12, 2024

(54) OBJECT RECOGNITION DEVICE, OBJECT RECOGNITION LEARNING DEVICE, METHOD, AND PROGRAM

(71) Applicant: NIPPON TELEGRAPH AND TELEPHONE CORPORATION, Tokyo (JP)

(72) Inventors: Yukito Watanabe, Tokyo (JP); Jun Shimamura, Tokyo (JP); Atsushi Sagata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 499 days.

(21) Appl. No.: 17/268,293

(22) PCT Filed: Aug. 8, 2019

(86) PCT No.: PCT/JP2019/031469
§ 371 (c)(1),
(2) Date: Feb. 12, 2021

(87) PCT Pub. No.: WO2020/036124
PCT Pub. Date: Feb. 20, 2020

(65) Prior Publication Data
US 2021/0303903 A1 Sep. 30, 2021

(30) Foreign Application Priority Data
Aug. 14, 2018 (JP) .................................. 2018-152701

(51) Int. Cl.
*G06T 3/40* (2006.01)
*G06F 16/583* (2019.01)
(Continued)

(52) U.S. Cl.
CPC .......... *G06T 3/4046* (2013.01); *G06F 16/583* (2019.01); *G06N 3/045* (2023.01);
(Continued)

(58) Field of Classification Search
CPC ... G06T 3/4046; G06F 16/583; G06F 18/243; G06N 3/045; G06N 3/084; G06N 20/00;
(Continued)

(56) References Cited

U.S. PATENT DOCUMENTS 10,380,753 B1 * 8/2019 Csordás ................... G06T 7/33
2014/0149376 A1 * 5/2014 Kutaragi ............ G06F 18/2323
707/706

FOREIGN PATENT DOCUMENTS

CN 107330381 A 11/2017

OTHER PUBLICATIONS

Tolias et al. (2016) "Particular Object Retrieval with Integral Max-Pooling of CNN Activations," ICLR, Published as a conference paper at ICLR 2016, 12 pages.

* cited by examiner

*Primary Examiner* — Molly Wilburn

(57) ABSTRACT

An object included in a low-resolution image can be recognized with a high degree of precision. An acquisition unit acquires, from a query image, an increased-resolution image, which is acquired by increasing the resolution of the query image, by performing pre-learned acquisition processing for increasing the resolution of an image. A feature extraction unit, using the increased-resolution image as input, extracts a feature vector of the increased-resolution image by performing pre-learned extraction processing for extracting a feature vector of an image. A recognition unit recognizes an object captured on the increased-resolution image on the basis of the feature vector of the increased- (Continued)

resolution image and outputs the recognized object as the object captured on the query image.

20 Claims, 4 Drawing Sheets

(51) Int. Cl.
  *G06N 3/045* (2023.01)
  *G06N 3/084* (2023.01)
  *G06N 20/00* (2019.01)
  *G06V 10/764* (2022.01)
  *G06V 10/82* (2022.01)
  *G06V 30/24* (2022.01)
(52) U.S. Cl.
  CPC ............. *G06N 3/084* (2013.01); *G06N 20/00* (2019.01); *G06V 10/764* (2022.01); *G06V 10/82* (2022.01); *G06V 30/2504* (2022.01)
(58) Field of Classification Search
  CPC ........ G06N 3/08; G06V 10/764; G06V 10/82; G06V 30/2504
  See application file for complete search history.

OBJECT RECOGNITION DEVICE, OBJECT RECOGNITION LEARNING DEVICE, METHOD, AND PROGRAM

CROSS-REFERENCE TO RELATED APPLICATIONS

This application is a U.S. 371 Application of International Patent Application No. PCT/JP2019/031469, filed on 8 Aug. 2019, which application claims priority to and the benefit of JP Application No. 2018-152701, filed on 14 Aug. 2018, the disclosures of which are hereby incorporated herein by reference in their entireties.

TECHNICAL FIELD

The present invention relates to an object recognition device, an object recognition learning device, a method, and a program, and more particularly to an object recognition device, an object recognition learning device, a method, and a program for recognizing an object included in an image.

BACKGROUND ART

With the increasing popularity of small imaging devices such as smartphones, demand has increased for techniques with which to recognize objects appearing on images acquired by capturing desired subjects in various locations and environments.

Various conventional techniques for recognizing an object on an image have been invented and disclosed, and a typical procedure based on an image search will now be described with reference to a technique described in NPL 1. First, a feature vector is extracted from an image using a Convolutional Neural Network (CNN). Next, an inner product of the feature vectors of two different images is calculated. The greater the calculated value, the more certainty with which the same object is considered to appear. A reference image database is constructed in advance using images (reference images) including the object to be recognized, and by searching for an image showing the same object as a newly input image (a query image), the object appearing on the query image can be specified.

CITATION LIST

Non Patent Literature

[NPL 1] G. Tolias, R. Sicre, and H. Jegou, Particular Object Retrieval with Integral Max-Pooling of CNN Activations, in ICLR, 2016.

SUMMARY OF THE INVENTION

Technical Problem

However, in a case where there is a difference in resolution between the query image and the reference image, different feature vectors are often acquired even when the same object appears on the images. As a result, a different object is retrieved, leading to a reduction in recognition precision. For example, in a case where a search is performed on a reference image having a high resolution using an image having a low resolution as the query image, high-frequency components are often lost from the query image, and as a result, the problem described above is likely to occur. In an example of this type, when the resolutions are aligned simply by reducing the resolution of the image showing the high resolution, much detailed information is lost, and therefore the recognition precision is not sufficiently improved.

The present invention has been designed in consideration of the circumstances described above, and an object thereof is to provide an object recognition device, a method, and a program with which an object included in a low-resolution image can be recognized with a high degree of precision.

Another object of the present invention is to provide an object recognition learning device, a method, and a program with which a neural network can be trained to recognize an object included in a low-resolution image with a high degree of precision.

Means for Solving the Problem

To achieve the objects described above, an object recognition device according to a first invention is a device for recognizing an object captured on a query image serving as a recognition subject, the device including an acquisition unit that acquires, from the query image, an increased-resolution image, which is acquired by increasing the resolution of the query image, by performing pre-learned acquisition processing for increasing the resolution of an image, a feature extraction unit which, using the increased-resolution image as input, extracts a feature vector of the increased-resolution image by performing pre-learned extraction processing for extracting a feature vector of an image, and a recognition unit that recognizes an object captured on the increased-resolution image on the basis of the feature vector of the increased-resolution image and outputs the recognized object as the object captured on the query image, wherein the acquisition processing of the acquisition unit is acquisition processing learned at least by associating an arbitrary image on which the object is captured with an image acquired by increasing the resolution of a low-resolution image corresponding to the arbitrary image, and during learning, the acquisition processing is optimized at the same time as the extraction processing.

An object recognition learning device according to a second invention is configured to include a parameter optimization unit which, in relation to a neural network that includes a resolution increasing layer, which is an intermediate layer that outputs an intermediate high-resolution image having an increased resolution using an image as input, and a feature extraction layer, which outputs a feature vector using the intermediate high-resolution image output from the resolution increasing layer as input, simultaneously optimizes respective parameters of the resolution increasing layer and the feature extraction layer of the neural network using a loss function, the loss function being expressed using a difference between an arbitrary image and the intermediate high-resolution image, which is acquired using a low-resolution image corresponding to the arbitrary image as input, a difference between a feature vector acquired using the intermediate high-resolution image as input and a feature vector acquired using an image to which an identical label to the arbitrary image is attached as input, and a difference between the feature vector acquired using the intermediate high-resolution image as input and a feature vector acquired using an image to which a different label to the arbitrary image is attached as input.

An object recognition method according to a third invention is implemented in an object recognition device for recognizing an object captured on a query image serving as a recognition subject, and includes a step in which an acquisition unit acquires, from the query image, an increased-resolution image, which is acquired by increasing the resolution of the query image, by performing pre-learned acquisition processing for increasing the resolution of an image, a step in which a feature extraction unit, using the increased-resolution image as input, extracts a feature vector of the increased-resolution image by performing pre-learned extraction processing for extracting a feature vector of an image, and a step in which a recognition unit recognizes an object captured on the increased-resolution image on the basis of the feature vector of the increased-resolution image and outputs the recognized object as the object captured on the query image, wherein the acquisition processing of the acquisition unit is acquisition processing learned at least by associating an arbitrary image on which the object is captured with an image acquired by increasing the resolution of a low-resolution image corresponding to the arbitrary image, and during learning, the acquisition processing is optimized at the same time as the extraction processing.

An object recognition learning method according to a fourth invention is executed so as to include a step in which a parameter optimization unit, in relation to a neural network that includes a resolution increasing layer, which is an intermediate layer that outputs an intermediate high-resolution image having an increased resolution using an image as input, and a feature extraction layer, which outputs a feature vector using the intermediate high-resolution image output from the resolution increasing layer as input, simultaneously optimizes respective parameters of the resolution increasing layer and the feature extraction layer of the neural network using a loss function, the loss function being expressed using a difference between an arbitrary image and the intermediate high-resolution image, which is acquired using a low-resolution image corresponding to the arbitrary image as input, a difference between a feature vector acquired using the intermediate high-resolution image as input and a feature vector acquired using an image to which an identical label to the arbitrary image is attached as input, and a difference between the feature vector acquired using the intermediate high-resolution image as input and a feature vector acquired using an image to which a different label to the arbitrary image is attached as input.

A program according to a fifth invention is a program for causing a computer to function as the respective units of the object recognition device according to the first invention.

A program according to a sixth invention is a program for causing a computer to function as the respective units of the object recognition learning device according to the second invention.

Effects of the Invention

According to the object recognition device, method, and program of the present invention, by acquiring the increased-resolution image from the query image by increasing the resolution of the query image, the increased-resolution image being acquired by performing pre-learned acquisition processing for increasing the resolution of an image, extracting the feature vector of the increased-resolution image using the increased-resolution image as input by performing pre-learned extraction processing for extracting a feature vector of an image, recognizing the object captured on the increased-resolution image on the basis of the feature vector of the increased-resolution image, and outputting the recognized object as the object captured on the query image, an effect is achieved in that an object included in a low-resolution image can be recognized with a high degree of precision.

According to the object recognition learning device, method, and program of the present invention, by simultaneously optimizing the respective parameters of the resolution increasing layer and the feature extraction layer of the neural network, an effect is achieved in that a neural network can be trained to recognize an object included in a low-resolution image with a high degree of precision.

DESCRIPTION OF EMBODIMENTS

An embodiment of the present invention will be described in detail below with reference to the figures.

In the prior art, as described above, in a case where there is a difference in resolution between the query image and the reference image, the precision cannot be sufficiently improved by aligning the resolutions either by reducing the resolution of the reference image or by increasing the resolution of the query image using a conventional technique. The reason for this is that high-frequency components are lost from the low-resolution image, and the high-frequency components often include detailed patterns and the like that are important for object recognition.

In the prior art, when the resolution of a low-resolution image is increased, the subjective image quality often improves, but when the aim is object recognition, the resolution may be increased in order to facilitate object recognition. Further, for the purpose of object recognition, it is sufficient to be able to extract feature vectors so that the distance between the feature vectors of objects of the same type is smaller than the distance between the feature vectors of objects of different types. In this embodiment of the present invention, in consideration of these circumstances, in order to obtain the feature extracting means described above and appropriate resolution increasing means for the feature extracting means, the feature extracting means and the resolution increasing means are optimized simultaneously. Here, "appropriate" means that rather than improving the subjective image quality, the feature extracting means, having been optimized for object recognition, acquires a value that more closely reflects a feature of the object to be recognized than before the resolution was increased.

<Configuration of Object Recognition Learning Device According to this Embodiment of the Present Invention>

Figure 1:
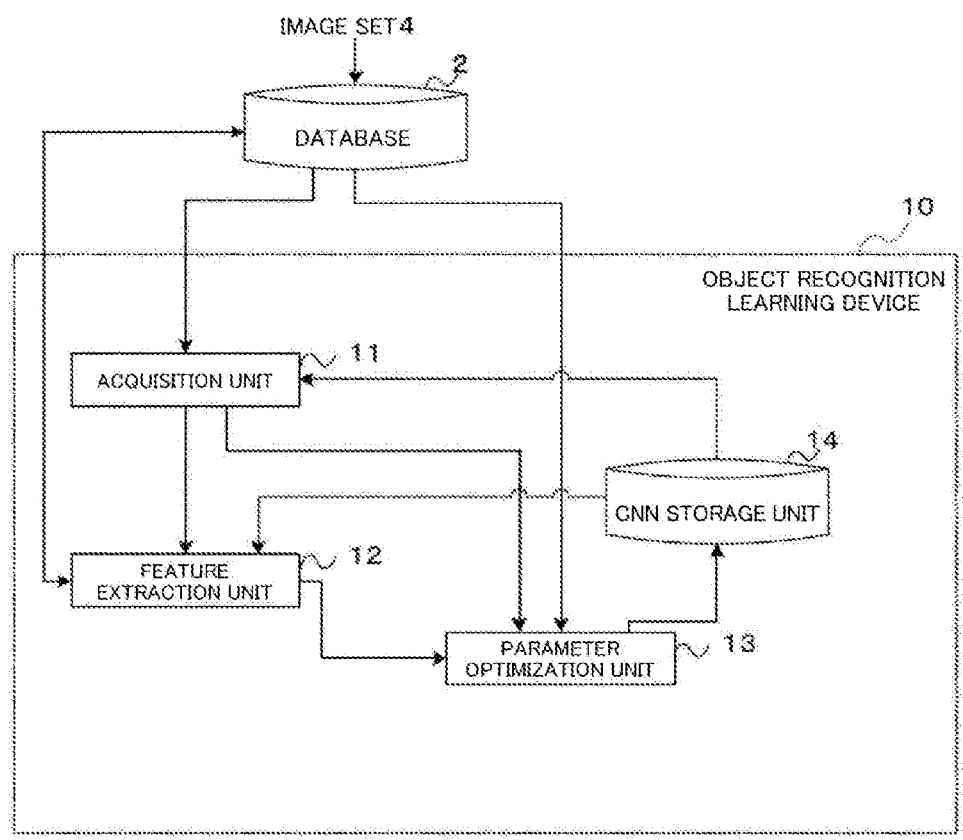
FIG. 1 is a block diagram showing a configuration of an object recognition learning device according to an embodiment of the present invention.

Next, a configuration of an object recognition learning device according to this embodiment of the present invention will be described. As shown in FIG. 1, an object recognition learning device 10 according to this embodiment of the present invention may be constituted by a computer including a CPU, a RAM, and a ROM storing a program and various data for executing an object recognition learning processing routine, to be described below.

The object recognition learning device 10 is connected to a database 2 via a communication means in order to exchange information therewith. The database 2 may be constituted by a file system installed in a general-purpose computer, for example. In this embodiment, it is assumed, as an example, that images of an image set 4 and various data relating to the images are stored in advance in the database 2. In this embodiment, it is assumed that an identifier such as a serial number ID (Identification) or a unique image file name is attached to each of the images in the image set 4 so that the images can be identified univocally. It is also assumed that for each image, the database 2 stores the identifier of the image in association with the image data of the image. Alternatively, the database 2 may be similarly installed in or constituted by an RDBMS (Relational Database Management System) or the like. The information stored in the database 2 may also include, as meta data, information (an image title, a summary, a keyword, or the like) expressing the content of each of the images, information (the data quantity of the image and the size of a thumbnail or the like) relating to the format of the image, and so on, for example. However, storage of this information is not essential to implementation of the present disclosure.

The database 2 may be provided either inside or outside the object recognition learning device 10, and any well-known means may be used as the communication means. Note that in this embodiment, it is assumed that the database 2 is provided outside the object recognition learning device 10 and a network such as the Internet or a TCP/IP (Transmission Control Protocol/Internet Protocol) is connected communicably to the object recognition learning device 10 as the communication means.

The image set 4 is a group of images to which labels expressing specific subjects included in the images are attached. The labels are integers, for example, and identical integers may be allocated to identical specific subjects included in the images. Further, it is assumed that in addition to the images of the image set 4 and the various data relating to the images, as described above, the database 2 stores low-resolution images acquired by reducing the resolution of each of the images in the image set 4. Any well-known method may be used for the resolution reduction processing, but in this embodiment, it is assumed that the resolution is reduced by performing reduction processing using the Bicubic method. For ease of description, an image subjected to the resolution reduction processing will be referred to as a low-resolution image, and the original image not yet subjected to the processing will be referred to as a high-resolution image. It is also assumed that identical labels are attached to the low-resolution image and the corresponding high-resolution image.

As shown in FIG. 1, the object recognition learning device 10 is configured to include an acquisition unit 11, a feature extraction unit 12, a parameter optimization unit 13, and a CNN storage unit 14.

In the object recognition learning device 10 of this embodiment, the acquisition unit 11 acquires an intermediate high-resolution image by increasing the resolution of the low-resolution image using a resolution increasing layer of a CNN, the feature extraction unit 12 extracts feature vectors from various images using a feature extraction layer of the CNN, and the parameter optimization unit 13 optimizes the parameters of the resolution increasing layer and the parameters of the feature extraction layer simultaneously using a loss function including errors between the images and distances between the feature vectors. The specific processing executed by the respective units will be described in detail below.

It is assumed that parameters of a Convolutional Neural Network (CNN) are stored in the CNN storage unit 14 in advance. The CNN of this embodiment is assumed to include a resolution increasing layer and a feature extraction layer. More specifically, a Convolutional Neural Network (CNN) in which a resolution increasing layer, which is an intermediate layer that outputs an intermediate high-resolution image having an increased resolution using an image as input, and a feature extraction layer, which outputs a feature vector using the intermediate high-resolution image output from the resolution increasing layer as input, are connected in that order. In other words, the final output of the resolution increasing layer forms the input of the feature extraction layer. Any well-known configurations may be used as the configurations of the respective layers. It is assumed here that a CNN described in NPL 2 is used as the resolution increasing layer and a configuration realized by removing a fully connected layer from a VGG16 (Very Deep Network) described in NPL 1 is used as the feature extraction layer.
[NPL 2] M. Harris, G. Shakhnarovich, and N. Ukita, Deep backprojection networks for super-resolution, CVPR, 2018.

The acquisition unit 11 outputs an intermediate high-resolution image $I^S$ having an increased resolution to the feature extraction unit 12 and the parameter optimization unit 13 using a low-resolution image $I^L$ relating to an arbitrary high-resolution image I as the input of the resolution increasing layer of the CNN. The parameters stored in the CNN storage unit 14 are used as the parameters of the resolution increasing layer. Note that in the resolution increasing processing of this embodiment, the resolution of the image is increased by being convolved by the resolution increasing layer using the CNN configured as described in NPL 2, but as long as a convolution method using a neural network is employed, there are no limitations thereon. Further, the arbitrary high-resolution image I is the high-resolution image serving as the original image of the low-resolution image $I^L$ before the resolution thereof is increased.

The feature extraction unit 12 extracts feature vectors using the intermediate high-resolution image $I^S$, a high-resolution image $I^+$ to which the same label as the arbitrary high-resolution image I is attached, and a high-resolution image $I^-$ to which a different label to the arbitrary high-resolution image I is attached as the input of the feature extraction layer of the CNN, and outputs the extracted feature vectors to the parameter optimization unit 13.

In the feature vector extraction processing performed by the feature extraction unit 12 of this embodiment, a feature value having a fixed dimension can be acquired by performing convolution using the feature extraction layer of the CNN configured as described in NPL 1, dividing the final convolution layer output into grids, and sum-pooling values acquired by spatial max pooling in the respective grids. Note that as long as the feature vector can be expressed as a vector having a fixed dimension using a neural network, there are no limitations thereon.

Processing executed in the feature extraction layer of the CNN used by the feature extraction unit 12 to extract the feature vector described in NPL 1 will now be described in detail. A suitable example for this embodiment uses MAC (Maximum Activations of Convolutions), as described in NPL 1, or RMAC (Regional Maximum Activation of Convolutions), or both thereof.

The final convolution layer output of the feature extraction layer of the CNN is set as a feature map of C×W×H. C, W, and H represent the number of channels, the width, and the height, respectively. When the feature map is expressed as X={$X_c$}, c=1, . . . , C, a feature vector f using MAC can be calculated from Formula (1), shown below.

[Formula 1]

$$f = [f_1 \ \ldots \ f_c \ \ldots \ f_C], \text{ with } f_c = \max_{x \in X_c} x \quad (1)$$

A feature vector using RMAC can be calculated by dividing a feature map X into rectangles of various predetermined sizes, extracting a MAC feature vector f from each of the feature maps divided into the variously sized rectangles, and then normalizing and adding together the MAC feature vectors f. L2 normalization may be used as the normalization. Further, the calculated feature vectors may be normalized and used in both MAC and RMAC. Furthermore, when MAC and RMAC are both used, a vector acquired by normalizing the respective feature vectors thereof, then adding the feature vectors together, and then normalizing the result again may be used as the final feature vector. Moreover, the used intermediate layer is not limited to a final convolution layer, and another intermediate layer may be used, as long as the layer is used consistently during learning processing and recognition processing. The feature vector extraction method is not limited to MAC and RMAC, and any known method capable of expressing a feature vector from an intermediate layer of a CNN as a vector having a fixed dimension may be used.

Note that the feature extraction unit 12 stores the feature vectors extracted respectively from the intermediate high-resolution image $I^S$, the high-resolution image $I^+$ to which the same label as the arbitrary high-resolution image I is attached, and the high-resolution image $I^-$ to which a different label to the arbitrary high-resolution image I is attached in the database 2.

On the basis of the arbitrary high-resolution image I, the intermediate high-resolution image $I^S$ acquired by increasing the resolution of the low-resolution image $I^L$, a feature vector $d^s$ of the intermediate high-resolution image $I^S$, a feature vector $d^+$ of the high-resolution image $I^+$ to which the same label is attached, and a feature vector $d^-$ of the high-resolution image $I^-$ to which a different label is attached, the feature vectors having been extracted by the feature extraction unit 12, the parameter optimization unit 13 optimizes the parameters of the resolution increasing layer and the parameters of the feature extraction layer simultaneously using a loss function that includes errors between the images and distances between the feature vectors, and updates the parameters of the CNN in the CNN storage unit 14.

The parameters of the resolution increasing layer are optimized so as to associate the arbitrary high-resolution image I and the intermediate high-resolution image $I^S$ with each other, thereby minimizing the error between the arbitrary high-resolution image I and the intermediate high-resolution image $I^S$. Further, the parameters of the feature extraction layer are optimized so as to reduce the distance to the feature vector $d^+$ of the high-resolution image $I^+$ to which the same label as the arbitrary high-resolution image I is attached and increase the distance to the feature vector $d^-$ of the high-resolution image $I^-$ to which a different label to the arbitrary high-resolution image I is attached.

More specifically, the parameter optimization unit 13 optimizes the parameters of the CNN so as to minimize a loss function shown below in Formula (2).

[Formula 2]

$$\lambda_1 \frac{1}{N} \sum_{i=1}^{N} (I_i - I_i^S)^2 + \lambda_2 \frac{1}{2} \max(0, m + \|d^s - d^+\|^2 - \|d^s - d^-\|^2) \quad (2)$$

$I_i^s$ is an intermediate high-resolution image acquired as the output of the resolution increasing layer when a low-resolution image $I_i^L$ corresponding to an arbitrary high-resolution image $I_i$ is input therein. $d^s$ is the feature vector acquired as the output of the feature extraction layer when the intermediate high-resolution image $I_i^s$ is input therein. $d^+$ is the feature vector acquired as the output of the feature extraction layer when the high-resolution image $I^+$ to which the same label as the arbitrary high-resolution image $I_i$ is attached is input therein. $d^-$ is the feature vector acquired as the output of the feature extraction layer when the high-resolution image $I^-$ to which a different label to the arbitrary high-resolution image $I_i$ is attached is input therein. Note that the intermediate high-resolution image may be either a single $I_i^s$ or a set of $I_i^s$. In other words, the intermediate high-resolution image may be either an image constituted by a single pixel (a case where N=1) or an image constituted by a plurality of pixels (N>1).

Hence, the loss function is expressed using a difference between the arbitrary intermediate high-resolution image $I_i$ and the intermediate high-resolution image $I_i^s$, a difference between the feature vector $d^s$ and the feature vector $d^+$, and a difference between the feature vector $d^s$ and the feature vector $d^-$.

All of the parameters of the CNN may be updated using an error backprojection method on the loss function described above. N is the number of pixels of I. Further, m is a fixed parameter representing a margin, and $\lambda_1$, $\lambda_2$ are fixed weight parameters. Arbitrary real numbers may be used for m, $\lambda_1$, and $\lambda_2$, and for example, m may be set at 0.1 and $\lambda_1$ and $\lambda_2$ at 0.5, or the like. By employing the loss function, it is possible to acquire CNN parameters with which feature vectors enabling a high-precision search can be extracted while increasing the resolution of the low-resolution image with a high degree of precision.

<Configuration of Object Recognition Device According to this Embodiment of the Present Invention>

Next, a configuration of an object recognition device according to this embodiment of the present invention will be described. The object recognition device recognizes an object captured on a query image serving as a recognition subject.

Figure 2:
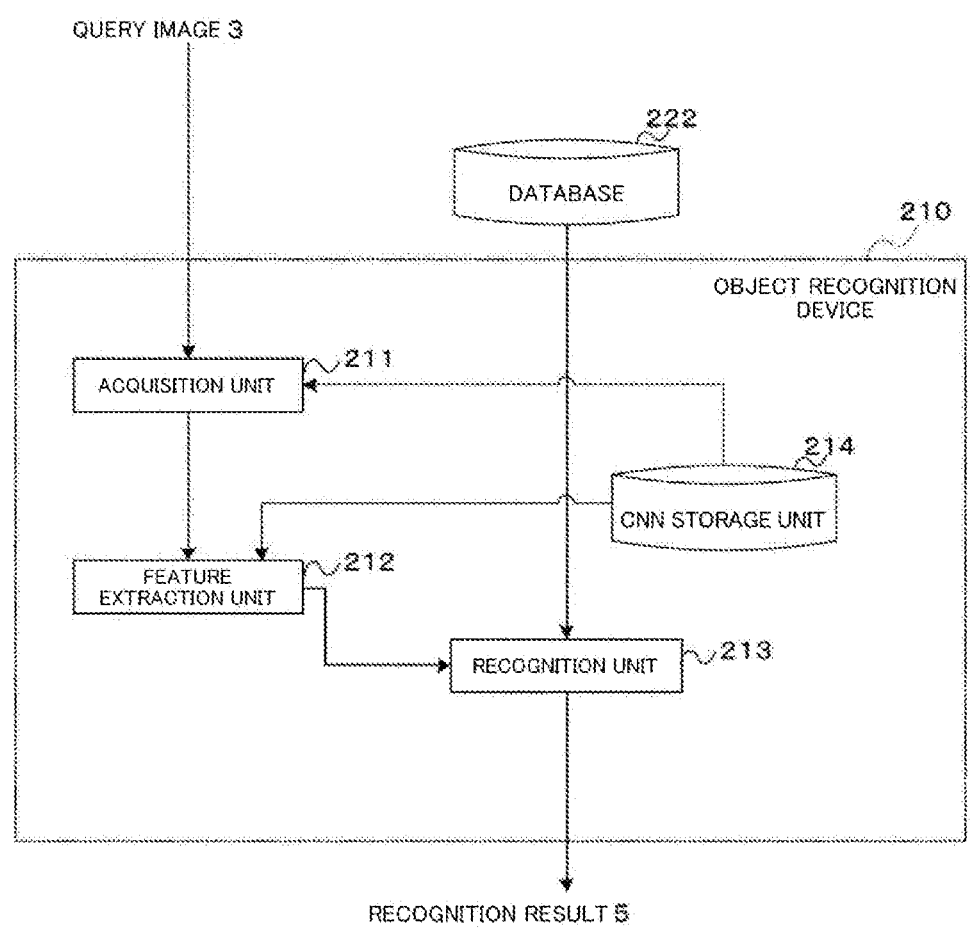
FIG. 2 is a block diagram showing a configuration of an object recognition device according to this embodiment of the present invention.

As shown in FIG. 2, an object recognition device 210 according to this embodiment of the present invention may be constituted by a computer including a CPU, a RAM, and a ROM storing a program and various data for executing an object recognition processing routine, to be described below.

The object recognition device 210 is connected to a database 222 via a communication means in order to exchange information therewith.

The database 222 has a similar configuration to the database 2 described above, and stores a group of reference images to which labels are attached. Further, it is assumed that each reference image is subjected to feature extraction processing in advance using the feature extraction layer of the CNN described above, and that the feature vectors of the reference images are stored in association with each other. The image set 4 may be used as the group of reference images. However, the images in the image set 4 do not necessarily have to be used as the reference images, and separate reference images may be stored.

As shown in FIG. 2, the object recognition device 210 is configured to include an acquisition unit 211, a feature extraction unit 212, a recognition unit 213, and a CNN storage unit 214.

The respective parameters of the resolution increasing layer and the feature extraction layer of the CNN, learned by the object recognition learning device 10 described above, are stored in the CNN storage unit 214.

The CNN used by the object recognition device 210 of this embodiment is the CNN including the resolution increasing layer and the feature extraction layer described above in relation to the object recognition learning device 10. The CNN is trained by means of parameter learning by associating an arbitrary high-resolution image with an image (an intermediate high-resolution image) acquired by increasing the resolution of a low-resolution image as the acquisition processing of the acquisition unit 211, and optimized at the same time as the extraction processing. Further, the CNN is a trained neural network trained by means of parameter learning so that an arbitrary high-resolution image is output as the output value of the intermediate layer (the resolution increasing layer).

Using a query image 3 as the input of the resolution increasing layer of the CNN, the acquisition unit 211 performs acquisition processing using the parameters stored in the CNN storage unit 214 so as to acquire, from the query image serving as the recognition subject, an increased-resolution image acquired by increasing the resolution of the query image. As the specific processing method, similarly to the acquisition unit 11 described above in relation to the object recognition learning device 10, the method described in NPL 2 is used.

Using the increased-resolution image as the input of the feature extraction layer of the CNN, the feature extraction unit 212 performs extraction processing using the parameters stored in the CNN storage unit 214 so as to extract a feature vector. As the specific processing method, similarly to the feature extraction unit 12 described above in relation to the object recognition learning device 10, the method described in NPL 1 is used.

The recognition unit 213 recognizes an object captured on the increased-resolution image on the basis of the feature vector of the increased-resolution image, sets the recognized object as an object captured on the query image 3, and outputs a recognition result 5.

More specifically, in the recognition unit 213, search processing is implemented by comparing the feature vector extracted from the query image 3 with the respective feature vectors of the reference images in the database 222. The comparison can be performed by, for example, measuring the distances between the feature vectors. The L2 distance, for example, may be used as the distances. Alternatively, inner products of the feature vector of the query image 3 and the respective feature vectors of the reference images may be determined, and in this case, the similarities between the feature vectors can be acquired.

Once the comparison described above has been performed on all of the reference images, the reference images are listed in order from the shortest distance or the closest similarity. The labels of the listed reference images are then set as labels including identical objects or labels including nearly identical objects and output as the recognition result 5.

<Actions of Object Recognition Learning Device According to this Embodiment of the Present Invention>

Figure 3:
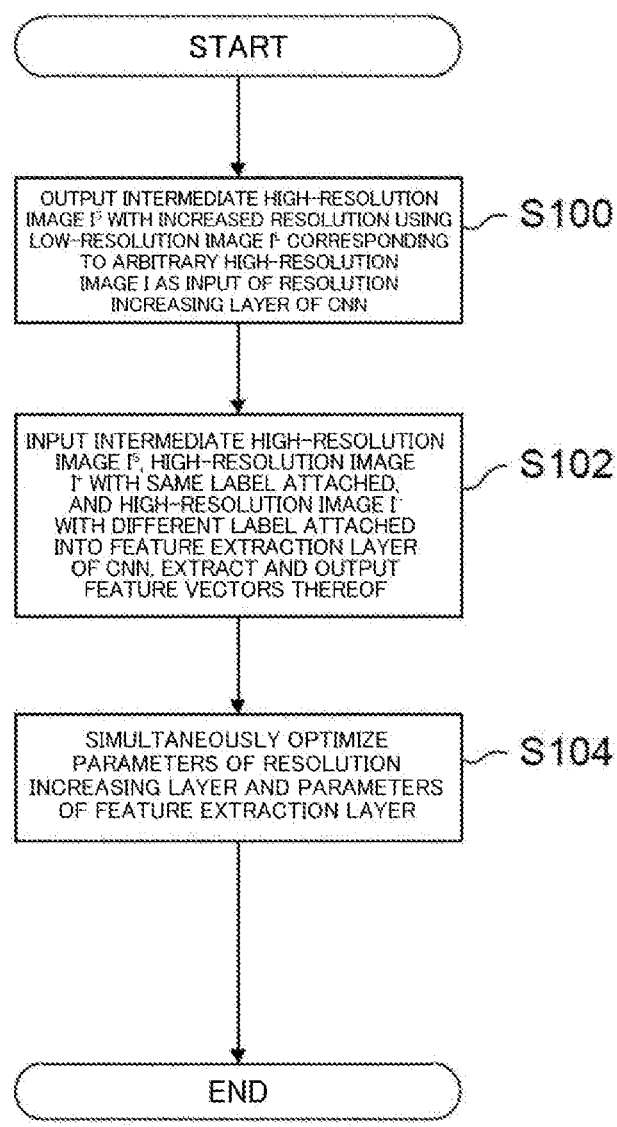
FIG. 3 is a flowchart showing an object recognition learning processing routine executed by the object recognition learning device according to this embodiment of the present invention.

Next, actions of the object recognition learning device 10 according to this embodiment of the present invention will be described. The object recognition learning device 10 executes an object recognition learning processing routine shown in FIG. 3.

In step S100, the acquisition unit 11 outputs the intermediate high-resolution image $I^S$ having an increased resolution to the feature extraction unit 12 and the parameter optimization unit 13 using the low-resolution image $I^L$ relating to the arbitrary high-resolution image I, which is included in the database 2, as the input of the resolution increasing layer of the CNN.

In step S102, the feature extraction unit 12 extracts feature vectors in relation to the intermediate high-resolution image $I^S$, the high-resolution image $I^+$ to which the same label as the arbitrary high-resolution image I is attached, and the high-resolution image $I^-$ to which a different label to the arbitrary high-resolution image I is attached using the respective images $I^S$, $I^+$, and $I^-$ as the input of the feature extraction layer of the CNN, and outputs the extracted feature vectors to the parameter optimization unit 13.

In step S104, on the basis of the arbitrary high-resolution image I, the intermediate high-resolution image $I^S$ acquired by increasing the resolution of the low-resolution image $I^L$, and the three feature vectors extracted by the feature extraction unit 12, the parameter optimization unit 13 optimizes the parameters of the resolution increasing layer and the parameters of the feature extraction layer simultaneously using the loss function of Formula (2), and updates the parameters of the CNN in the CNN storage unit 14. The three feature vectors are the feature vector $d^s$ of the intermediate high-resolution image $I^S$, the feature vector $d^+$ of the high-resolution image $I^+$ to which the same label is attached, and the feature vector $d^-$ of the high-resolution image $I^-$ to which a different label is attached. As a result, the parameters of the resolution increasing layer are optimized so that the arbitrary high-resolution image I and the intermediate high-resolution image $I^S$ are associated with each other, thereby reducing the error between the arbitrary high-resolution image I and the intermediate high-resolution image $I^S$. Further, the parameters of the feature extraction layer are optimized so as to reduce the distance to the feature vector $d^+$ of the high-resolution image $I^+$ to which the same label as the arbitrary high-resolution image I is attached and increase the distance to the feature vector $d^-$ of the high-resolution image $I^-$ to which a different label to the arbitrary high-resolution image I is attached.

With the object recognition learning device according to this embodiment of the present invention, as described above, a neural network can be trained to recognize an object included in a low-resolution image with a high degree of precision.

<Actions of Object Recognition Device According to this Embodiment of the Present Invention>

Figure 4:
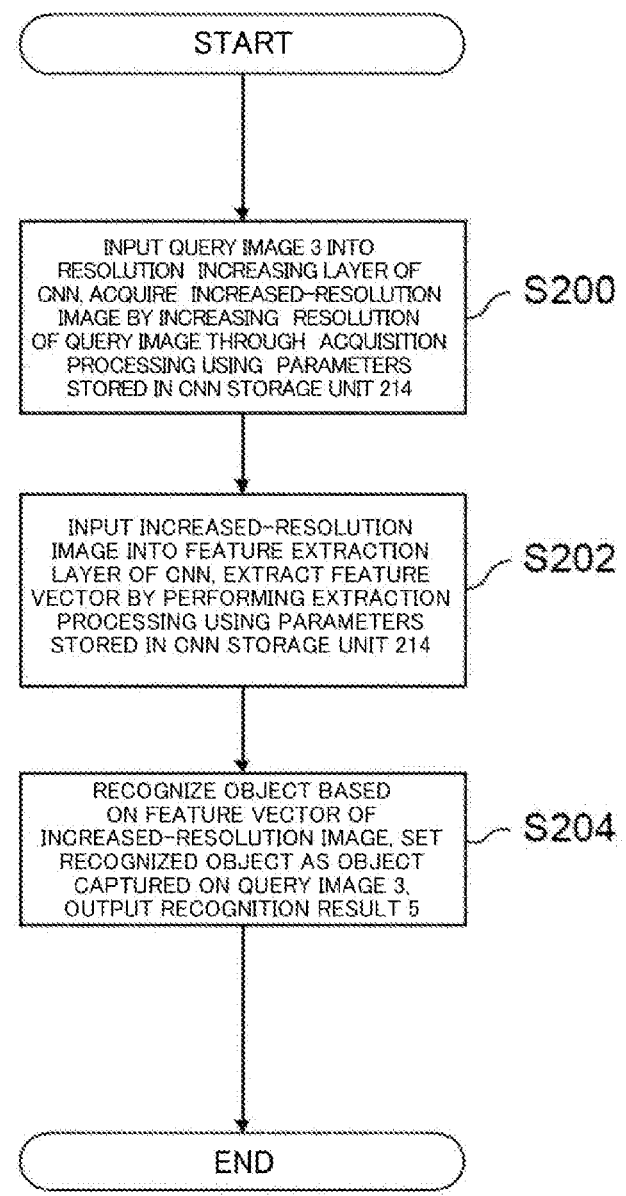
FIG. 4 is a flowchart showing an object recognition processing routine executed by the object recognition device according to this embodiment of the present invention.

Next, actions of the object recognition device 210 according to this embodiment of the present invention will be described. The object recognition device 210 executes an object recognition processing routine shown in FIG. 4.

In step S200, using the query image 3 as the input of the resolution increasing layer of the CNN, the acquisition unit 211 performs acquisition processing using the parameters stored in the CNN storage unit 214 so as to acquire, from the query image 3 serving as the recognition subject, an increased-resolution image acquired by increasing the resolution of the query image.

In step S202, using the increased-resolution image as the input of the feature extraction layer of the CNN, the feature extraction unit 212 performs extraction processing using the parameters stored in the CNN storage unit 214 so as to extract a feature vector.

In step S204, the recognition unit 213 recognizes an object captured on the increased-resolution image on the basis of the feature vector of the increased-resolution image, sets the recognized object as the object captured on the query image 3, and outputs the recognition result 5.

With the object recognition device according to this embodiment of the present invention, as described above, an object included in a low-resolution image can be recognized with a high degree of precision.

Note that the present invention is not limited to the embodiment described above and may be subjected to various amendments and used in various applications within a scope that does not depart from the spirit of the invention.

For example, in the example described in the above embodiment, the object recognition learning device is configured to include the acquisition unit and the feature extraction unit, but the present invention is not limited thereto. For example, the object recognition learning device may be constituted by the parameter optimization unit alone, without including the acquisition unit and the feature extraction unit. In this case, the intermediate high-resolution image $I^S$, the resolution of which is increased by inputting the low-resolution image $I^L$ into the resolution increasing layer, the feature vector $d^s$ of the intermediate high-resolution image $I^S$, the feature vector $d^+$ of the image $I^+$, and the feature vector $d^-$ of the image $I^-$ may be acquired in advance so that only the processing the parameter optimization unit need be performed.

REFERENCE SIGNS LIST 2, 222 Database
3 Query image
4 Image set
5 Recognition result
10 Object recognition learning device
11, 211 Acquisition unit
12, 212 Feature extraction unit
13 Parameter optimization unit
14, 214 CNN storage unit
210 Object recognition device
213 Recognition unit

The invention claimed is:

1. An object recognition learning device for recognizing an object captured on a query image serving as a recognition subject, the device comprising:
an acquirer configured to acquire, from the query image, an increased-resolution image, which is acquired by increasing the resolution of the query image, by performing pre-learned acquisition processing for increasing the resolution of an image;
a feature extractor configured to, using the increased-resolution image as input, extract a feature vector of the increased-resolution image by performing pre-learned extraction processing for extracting a feature vector of an image; and
a recognizer configured to recognize an object captured on the increased-resolution image on the basis of the feature vector of the increased-resolution image and outputs the recognized object as the object captured on the query image, wherein the acquisition processing of the acquirer is acquisition processing learned at least by associating an arbitrary image on which the object is captured with an image acquired by increasing the resolution of a low-resolution image corresponding to the arbitrary image, and during learning, the acquisition processing is optimized at the same time as the extraction processing.

2. The object recognition learning device according to claim 1, wherein the acquisition processing uses a trained neural network that has been trained, using at least the arbitrary image and the low-resolution image corresponding to the arbitrary image as training data, to output the arbitrary image as an output value of a predetermined intermediate layer of a neural network that uses the low-resolution image as input.

3. The object recognition learning device according to claim 1, the device further comprising:
a parameter optimizer configured to, in relation to a neural network that includes a resolution increasing layer, which is an intermediate layer that outputs an intermediate high-resolution image having an increased resolution using an image as input, and a feature extraction layer, which outputs a feature vector using the intermediate high-resolution image output from the resolution increasing layer as input,
simultaneously optimize respective parameters of the resolution increasing layer and the feature extraction layer of the neural network using a loss function, the loss function being expressed using:
a difference between an arbitrary image and the intermediate high-resolution image, which is acquired using a low-resolution image corresponding to the arbitrary image as input,
a difference between a feature vector acquired using the intermediate high-resolution image as input and a feature vector acquired using an image to which an identical label to the arbitrary image is attached as input, and
a difference between the feature vector acquired using the intermediate high-resolution image as input and a feature vector acquired using an image to which a different label to the arbitrary image is attached as input.

4. The object recognition learning device according to claim 3, wherein the parameter optimizer simultaneously optimizes respective parameters of the resolution increasing layer and the feature extraction layer of the neural network using the loss function shown below in Formula (1):

[Formula 1]

$$\lambda_1 \frac{1}{N}\sum_{i=1}^{N}(I_i - I_i^S)^2 + \lambda_2 \frac{1}{2}\max\left(0, m + \|d^s - d^+\|^2 - \|d^s - d^-\|^2\right) \quad (1)$$

where $I_i$ is the arbitrary image, $I_i^s$ is the intermediate high-resolution image acquired as the output of the resolution increasing layer when a low-resolution image $I_i^L$ corresponding to the arbitrary image $I_i$ is input therein, $d^s$ is the feature vector acquired as the output of the feature extraction layer when the intermediate high-resolution image $I_i^s$ is input therein, $d^+$ is the feature vector acquired as the output of the feature extraction layer when an image having an identical label to the arbitrary image is input therein, and d⁻ is the feature vector acquired as the output of the feature extraction layer when an image having a different label to the arbitrary image is input therein.

5. The object recognition learning device according to claim 3, wherein the parameter optimizer updates parameters of a convolution neural network based on a backward propagation of errors.

6. The object recognition learning device according to claim 1, wherein the pre-learned acquisition processing for increasing the resolution of the image includes a convolutional neural network.

7. The object recognition learning device according to claim 1, wherein the pre-learned extraction processing includes a very deep network without a fully connected layer.

8. The object recognition learning device according to claim 1, the device further comprising:
the feature extractor further configured to:
divide a final convolution layout output into a plurality of grids;
sum-pool values acquired by spatial max pooling in the respective grids; and
extract a feature value of the feature vector based on the sum-pooled values.

9. The object recognition learning device according to claim 1, wherein the feature extractor uses either or both of:
maximum activations of convolution, and
a regional maximum activation of convolutions.

10. The object recognition learning device according to claim 1, the device further comprising:
the recognizer further configured to list a set of reference images based on a distance between a feature vector of each reference image and a feature vector of the query image.

11. An object recognition method implemented in an object recognition device for recognizing an object captured on a query image serving as a recognition subject, comprising:
acquiring, by an acquire, from the query image, an increased-resolution image, which is acquired by increasing the resolution of the query image, by performing pre-learned acquisition processing for increasing the resolution of an image;
extracting, by a feature extractor using the increased-resolution image as input, a feature vector of the increased-resolution image by performing pre-learned extraction processing for extracting a feature vector of an image; and
recognizing, by a recognizer, an object captured on the increased-resolution image on the basis of the feature vector of the increased-resolution image and outputs the recognized object as the object captured on the query image, wherein the acquisition processing of the acquirer is acquisition processing learned at least by associating an arbitrary image on which the object is captured with an image acquired by increasing the resolution of a low-resolution image corresponding to the arbitrary image, and during learning, the acquisition processing is optimized at the same time as the extraction processing.

12. The object recognition method according to claim 11, wherein the pre-learned acquisition processing for increasing the resolution of the image includes a convolutional neural network.

13. The object recognition method according to claim 11, wherein the pre-learned acquisition processing for increasing the resolution of the image includes a convolutional neural network.

14. The object recognition method according to claim 11, the method further comprising:
dividing, by the feature extractor, a final convolution layout output into a plurality of grids;
sum-pooling values acquired by spatial max pooling in the respective grids; and
extracting a feature value of the feature vector based on the sum-pooled values.

15. The object recognition method according to claim 11, wherein the feature extractor uses either or both of:
maximum activations of convolution, and
a regional maximum activation of convolutions.

16. The object recognition method according to claim 11, the method further comprising:
listing, by the feature extractor, a set of reference images based on a distance between a feature vector of each reference image and a feature vector of the query image.

17. An object recognition learning method, the method comprising:
simultaneously optimizing, by a parameter optimizer in relation to a neural network that includes a resolution increasing layer, which is an intermediate layer that outputs an intermediate high-resolution image having an increased resolution using an image as input, and a feature extraction layer, which outputs a feature vector using the intermediate high-resolution image output from the resolution increasing layer as input, respective parameters of the resolution increasing layer and the feature extraction layer of the neural network using a loss function, the loss function being expressed using:
a difference between an arbitrary image and the intermediate high-resolution image, which is acquired using a low-resolution image corresponding to the arbitrary image as input,
a difference between a feature vector acquired using the intermediate high-resolution image as input and a feature vector acquired using an image to which an identical label to the arbitrary image is attached as input, and
a difference between the feature vector acquired using the intermediate high-resolution image as input and a feature vector acquired using an image to which a different label to the arbitrary image is attached as input.

18. The object recognition learning method according to claim 17, wherein the parameter optimizer updates parameters of a convolution neural network based on a backward propagation of errors.

19. The object recognition learning method according to claim 17, wherein the neural network includes a convolutional neural network.

20. The object recognition learning method according to claim 17, wherein the parameter optimizer optimizes the respective parameters to minimize a value of the loss function.

* * * * *